Oct. 18, 1955
B. A. ARVIDSON
2,720,994
LABEL FEED AND SEALING MECHANISM
Filed Oct. 11, 1951
7 Sheets-Sheet 3
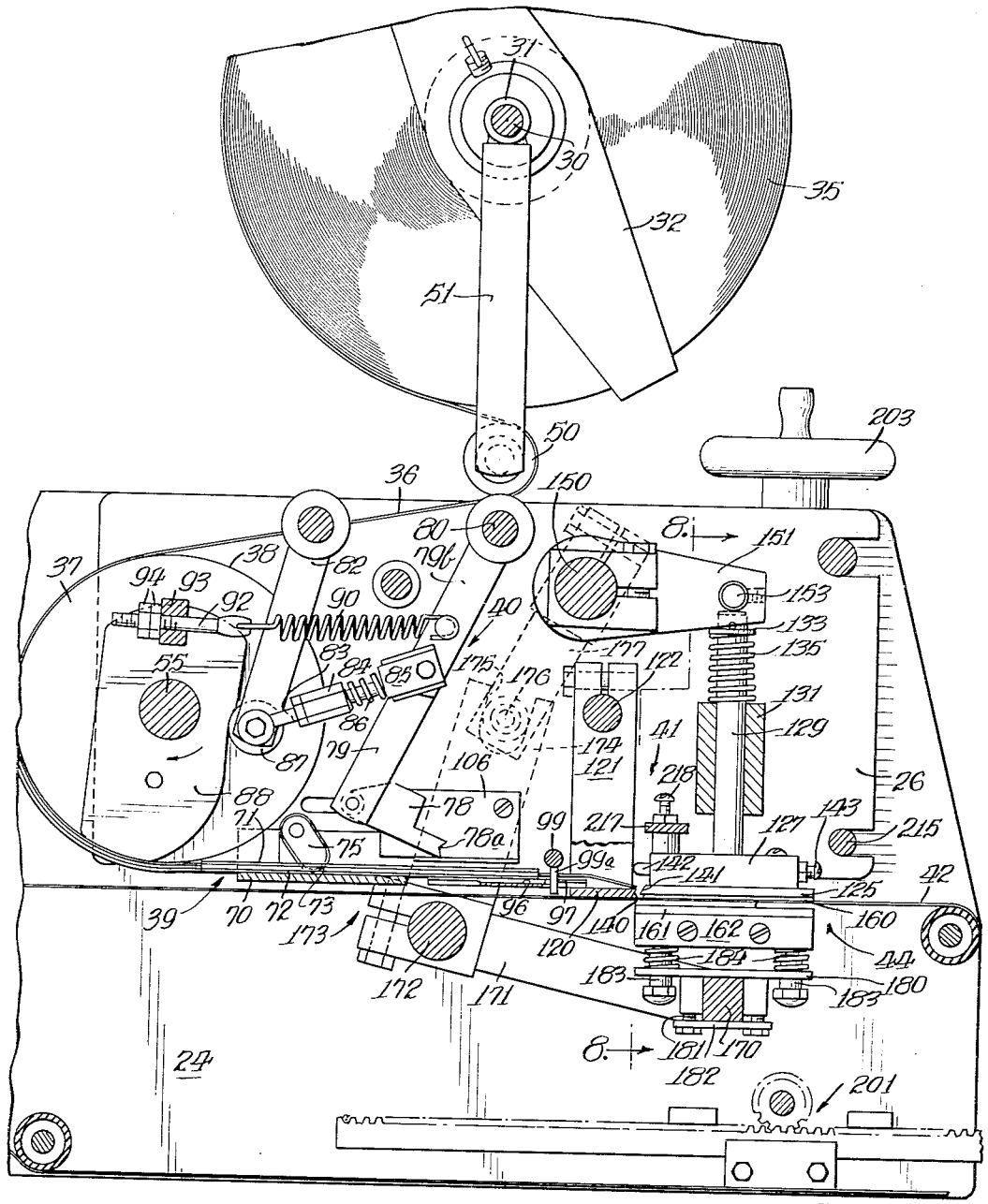
INVENTOR.
Bengt A. Arvidson
BY
Banning & Banning
Attys.

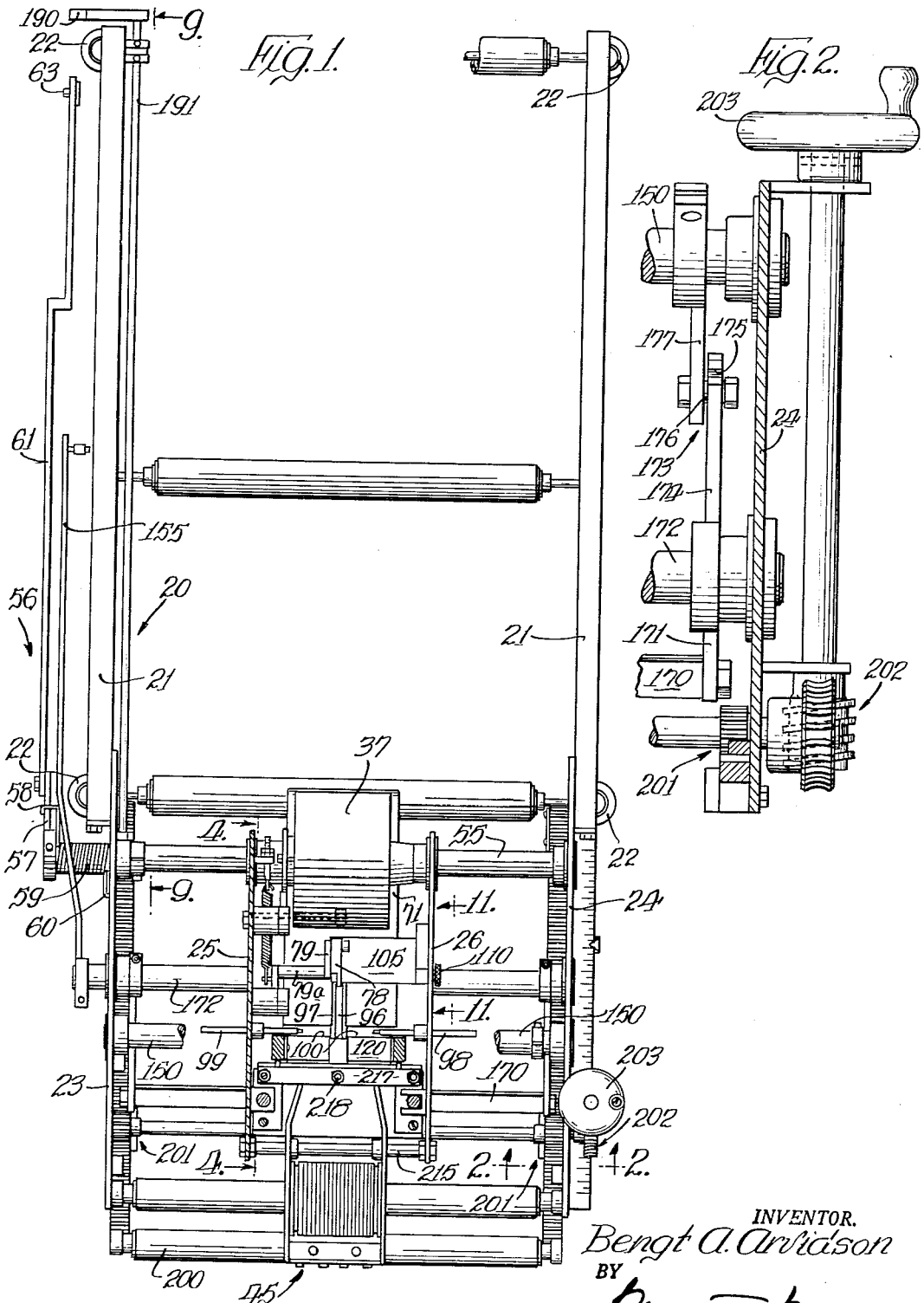

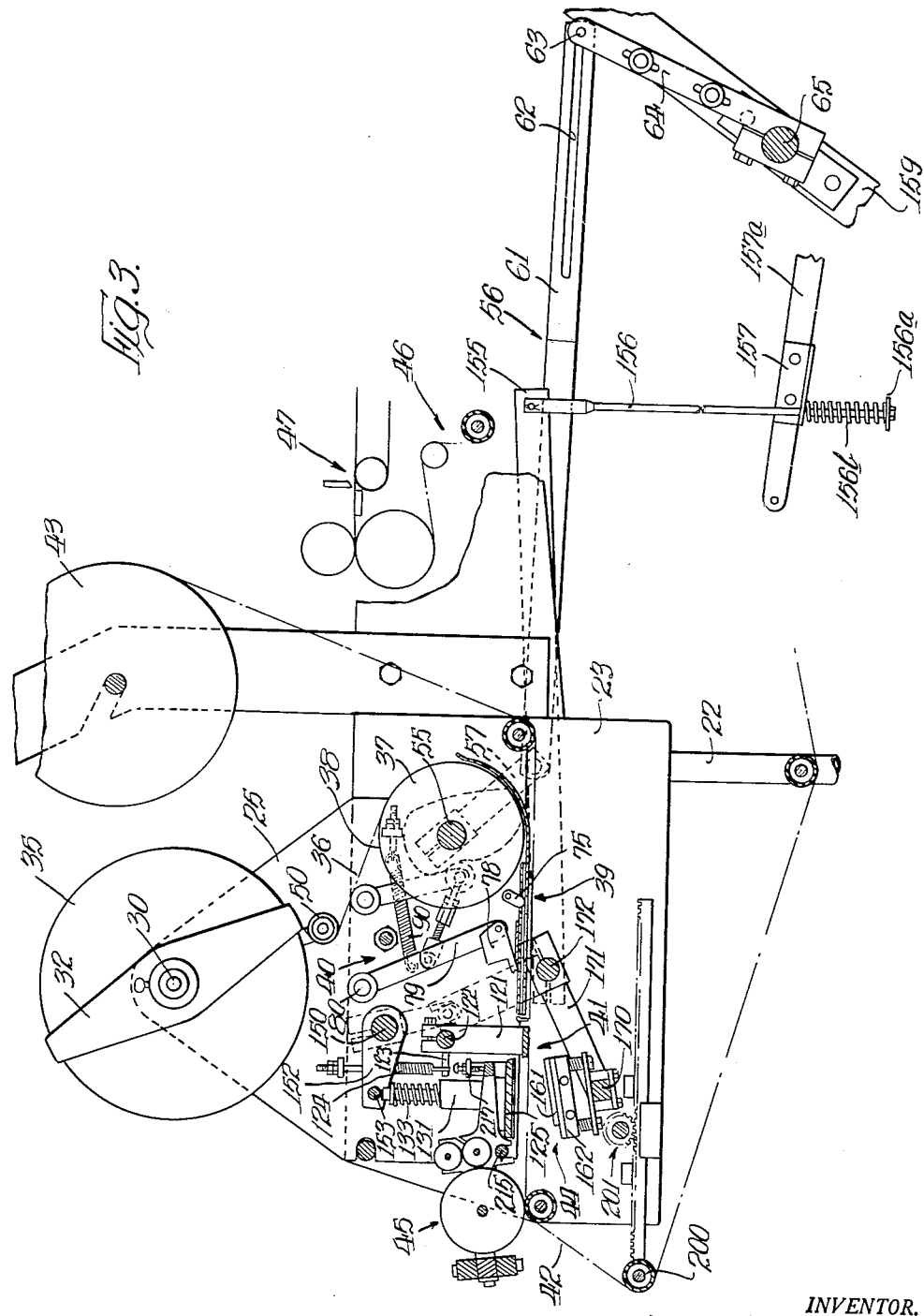

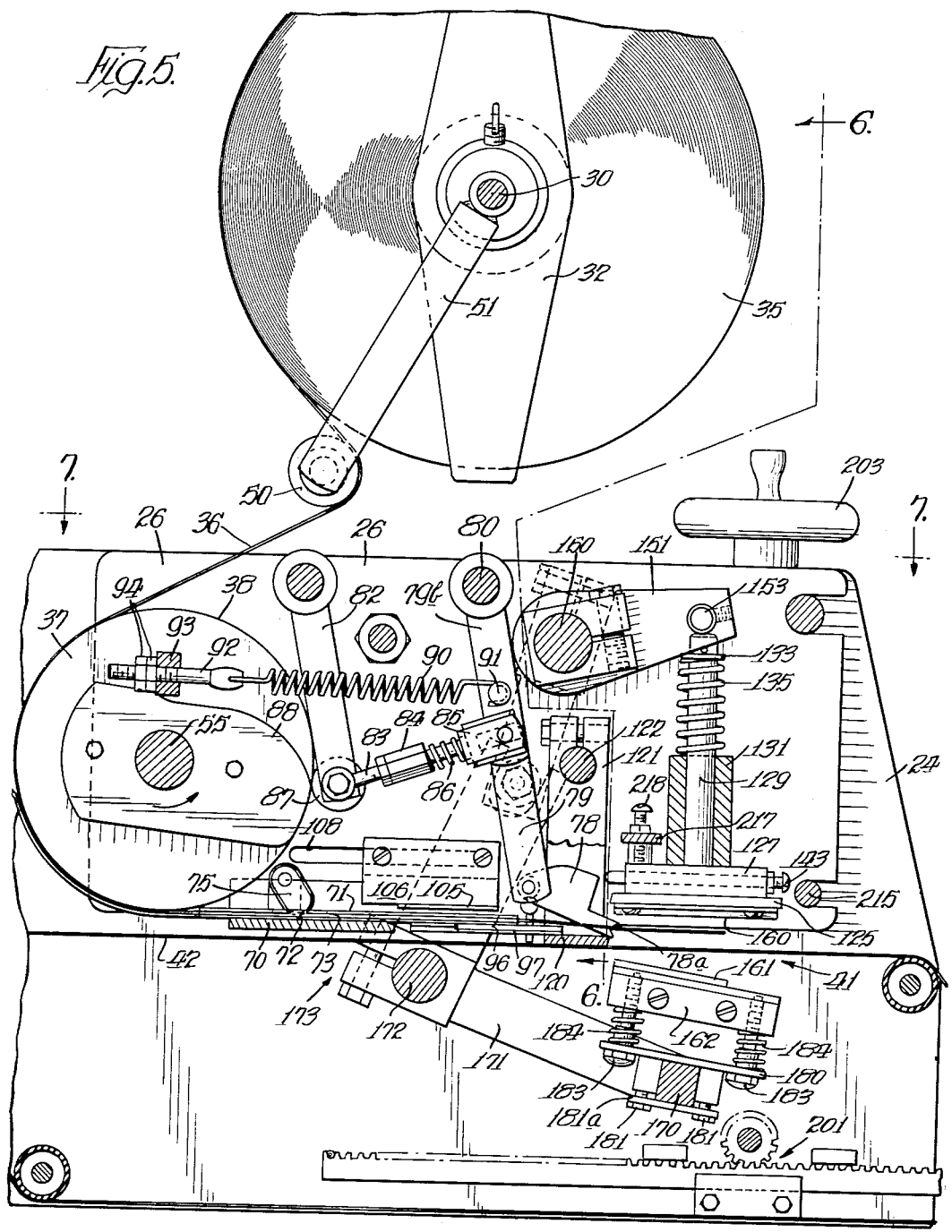

Oct. 18, 1955    B. A. ARVIDSON    2,720,994
LABEL FEED AND SEALING MECHANISM
Filed Oct. 11, 1951    7 Sheets-Sheet 5

INVENTOR.
Bengt A. Arvidson
BY

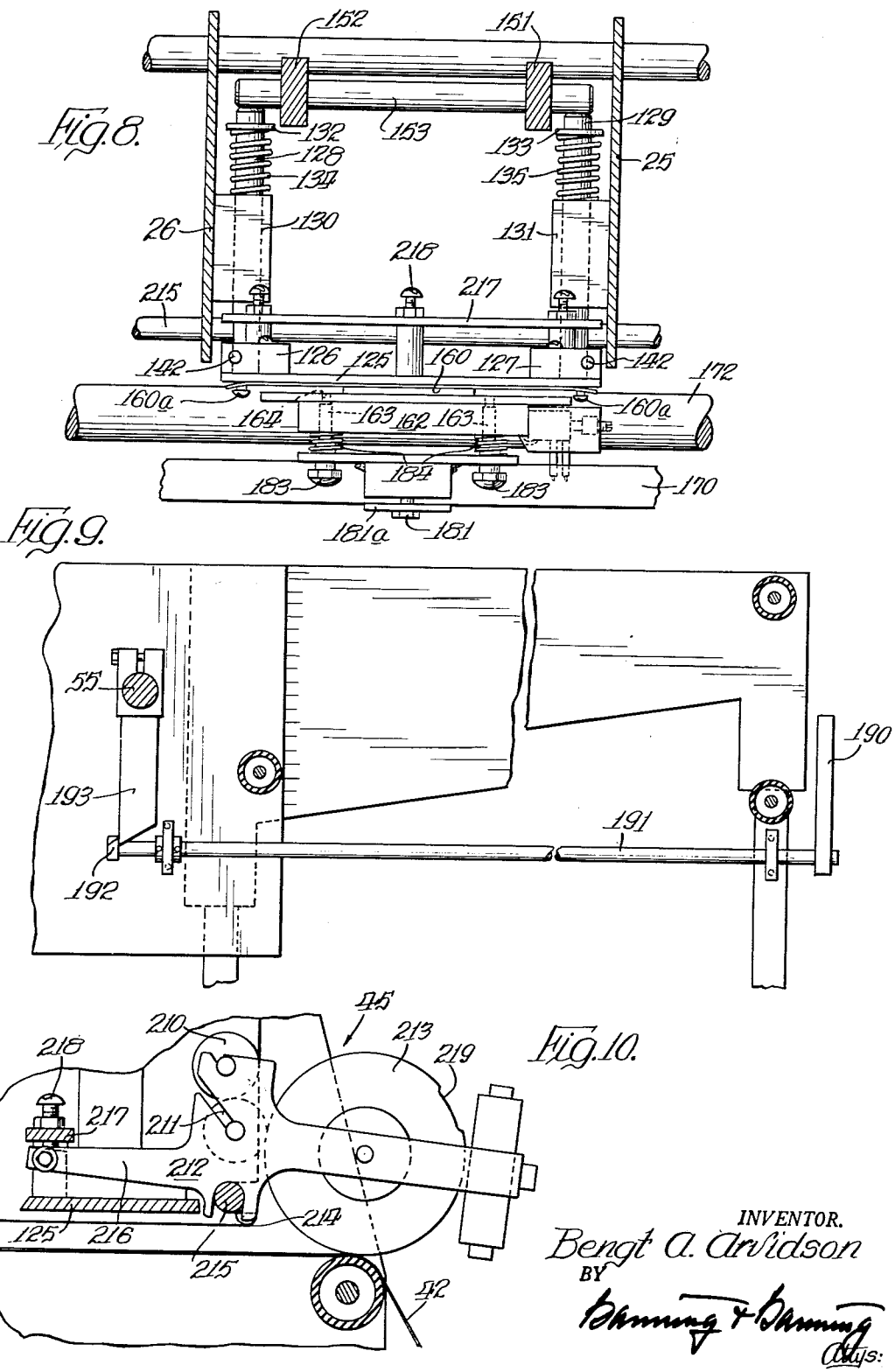

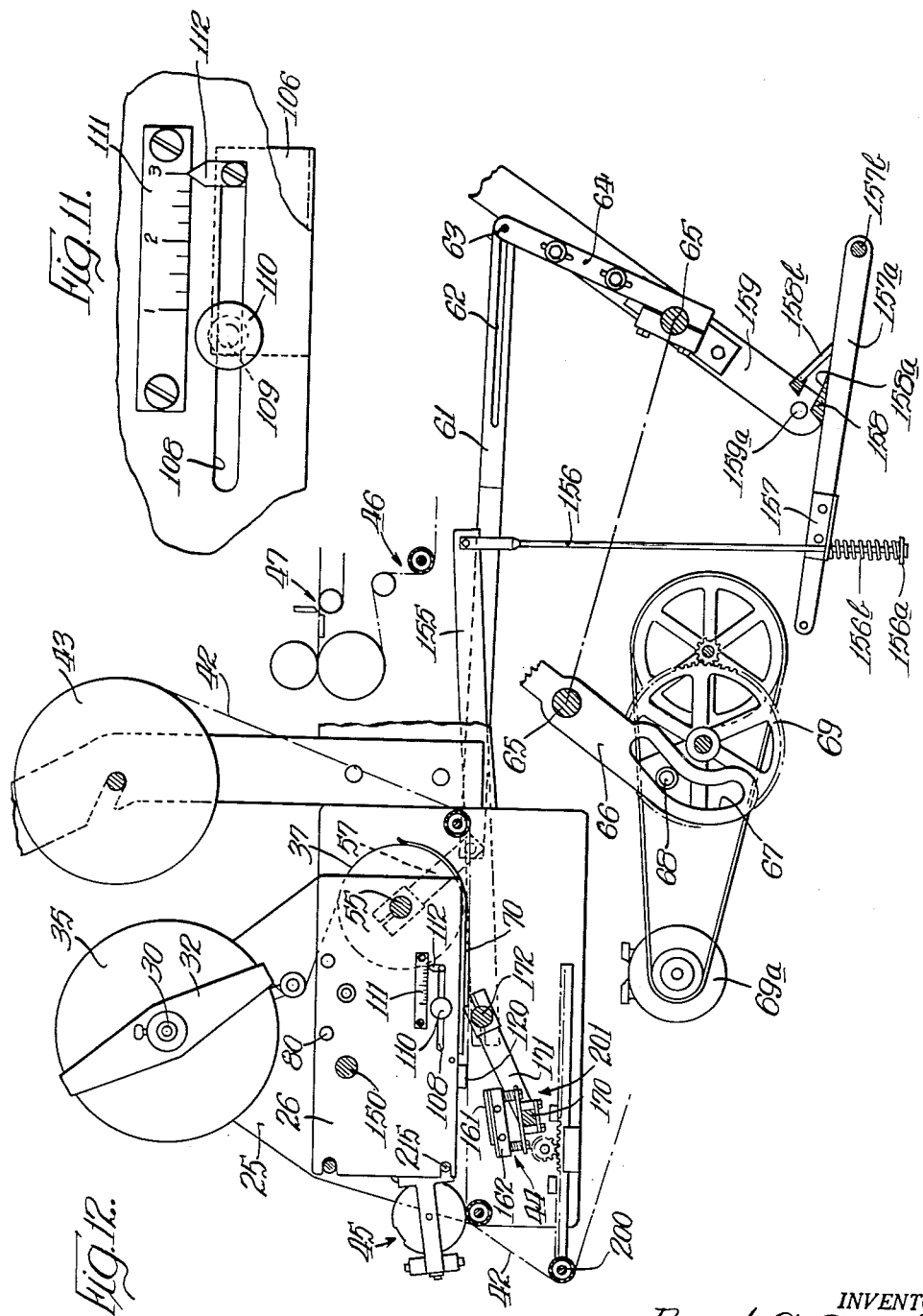

United States Patent Office 2,720,994
Patented Oct. 18, 1955

2,720,994

LABEL FEED AND SEALING MECHANISM

Bengt A. Arvidson, Villa Park, Ill., assignor to Miller Wrapping & Sealing Machine Co., Chicago, Ill., a corporation of Illinois Application October 11, 1951, Serial No. 250,847

13 Claims. (Cl. 216—23)

This invention relates to an apparatus for feeding an endless strip of material to a cutter to cut the strip into sections and for heat sealing the cut sections to a supporting material.

It is the general object of this invention to produce a new and improved apparatus for feeding a continuous strip of material, such as paper and the like, to a cutter for cutting the strip into sections of predetermined lengths, which apparatus may be provided with improved means for sealing the cut sections to a supporting material.

One of the features of the present invention is the provision of an apparatus which is adapted to feed a continuous strip of material, which may be conveniently fed from a supply roll, in predetermined increments.

A further feature of the invention is the provision, in an apparatus such as described in the above paragraph, of novel means for cutting the incremental portions fed by the feeding means into sections having a length equal to the increment fed by the feeding means.

A further feature of the invention is the provision, in an apparatus of the general type described in the preceding two paragraphs, of novel means for heat sealing cut sections to a supporting material.

A further feature of the invention is the provision of an apparatus for feeding a flexible strip of paper or the like, which is provided with perforations, in increments equal to the distance between perforations in which the apparatus includes a feed finger adapted to engage a perforation and movable to move the strip, with such movement of the strip serving to snub the strip against a rotating feed roll which supplies the power to deliver the strip from a supply source.

A further feature of the invention is the provision, in an apparatus of the type described in the preceding paragraph, of means adapted to determine the length of movement of the feed finger and to further provide such an apparatus with means for preventing the feed finger from engaging a perforation until the remaining movement permitted the feed finger is equal to the desired incremental feed, and thus to provide an apparatus which is capable of handling an infinite number of different incremental lengths within its operational range.

A further feature of the invention is the provision, in an apparatus of the type hereinbefore described, of means for cutting the incremental lengths feed by a feeding means into sections including a pair of scissor-like cutter bars for cutting the strip and including means biasing one of the cutter bars toward the other to insure a precise and accurate cut.

A further feature of the invention is the provision, in a cutter means of the type described above, of a pair of cutter bars, one vertically movable relative to the other to effect the cut, in which stop means are provided for preventing the biasing means from moving one of the cutter bars vertically beneath the other and in which one of the cutter bars is slanted with respect to the other so that during movement of the movable cutter bar the other is moved in a direction opposed to the biasing means to maintain the desired contact between the cutters during the cutting operation.

A further feature of the invention is the provision of a pair of flat plates which are movable toward each other, one above and one below a supporting medium for supporting cut sections, to press the cut sections against the support with one of the plates being provided with heating means for heat sealing the sections to the support.

A further feature of the invention is the provision, in a sealing means of the type described above, of a heated plate which is readily removable and replaceable by similar plates of different size so that cut sections of different size may be sealed to the support.

Other and further objects and features of the invention will be readily apparent from the following description and drawings, in which:

Fig. 1 is a top plan view of an apparatus embodying the invention;

Fig. 2 is a vertical section taken substantially along the line 2—2 of Fig. 1;

Fig. 3 is a vertical section through the apparatus shown in Fig. 1;

Fig. 4 is an enlarged detail sectional view taken along the line 4—4 of Fig. 1;

Fig. 5 is a view like Fig. 4 showing the apparatus in a different position;

Fig. 8 is a vertical section taken along line 8—8 of Fig. 4;

Fig. 9 is a view showing the stop mechanism and taken along the line 9—9 of Fig. 1;

Fig. 10 is a side elevation of the printing apparatus which may be used in conjunction with the apparatus shown;

Fig. 11 is a side elevation of the indicating means for the feed device and taken along the line 11—11 of Fig. 1; and Fig. 12 is a somewhat schematic view showing the drive mechanism for the apparatus.

Figure 6:
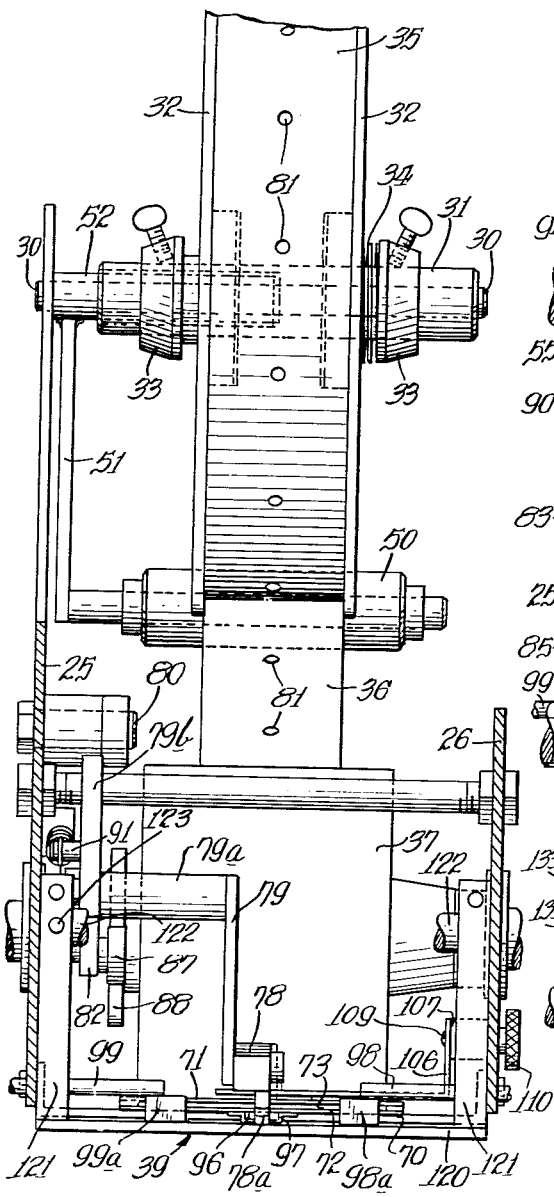
Fig. 6 is a front view of a portion of the apparatus taken along the line 6—6 of Fig. 5.

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

While it will be readily apparent to those skilled in the art that the invention hereinafter to be described may be embodied in many forms of apparatus, for the purpose of exemplary disclosure it has been shown as embodied in a labeling machine for cutting a substantially continuous strip of perforated labels into sections having a length equal to the distance between perforations and then for heat sealing the labels to a supporting thermoplastic material, such as cellophane and the like.

Referring now to Figs. 1 and 3 of the drawings, the apparatus is supported on a framework 20 including spaced parallel angle iron members, designated 21, supported above a base or floor by a plurality of legs such as the leg 22. A pair of upstanding side plates 23 and 24 are secured to the frame members near one end of the machine and support, in some cases rotatably and in other cases fixedly as will hereinafter be described, a plurality of rods some of which in turn support a second pair of vertically upstanding plates 25 and 26. This last-mentioned pair of plates, namely the plates 25 and 26, carry the greater portion of the mechanism comprising the invention, and the entire apparatus so supported is slidable as a unit on the rods towards either one of the side plates 23 or 24 for purposes hereinafter to be described.

As best seen in Fig. 3, the apparatus carried by the plates 25 and 26 include a shaft 30 which in turn rotatably carries a sleeve 31. A pair of bracket arms 32 are held on the sleeve 31 by means of collars 33, one of which is provided with a spring 34 adapted to press against a continuous strip of labels in the form of a roll 35. The free end 36 of the strip of labels may be led, as indicated, over a feed roller 37 which is provided with a rubber or other high friction surface 38, through guide means generally designated 39 and into the path of an oscillating or swinging feed mechanism generally designated 40 which feeds the strip into a cutting device 41 wherein the labels are cut into individual sections. From the cutting device, the cut sections are heat sealed to a relatively wide strip of thermoplastic material 42, such as cellophane, fed from a suppjly roll 43 by means of the sealing apparatus generally designated 44. If desired, means in the form of a printing device 45 may be provided on the framework of the machine to print data, such as dates and the like, on the labels after they have been sealed to the cellophane material. The strip 42 of thermoplastic material to which labels have been heat sealed is then led by a pluarlity of rolls including the rolls 46 to a cutter 47 which cuts the relatively large cellophane sheets into sections each bearing a label and each being suitable for wrapping an article.

Referring now to Figs. 4 and 5, the free end 36 of the label strip is led over an anti-backlash roller 50 rotatably carried by an arm 51 welded to a second sleeve 52 rotatably mounted on the shaft 30. By leading the strip over the roller 50 so mounted, some tension is always kept upon the strip and at the same time the arm 51 insures that a given amount of excess or slack strip is present in the path of travel of the strip from the roll 35 to the feeding device so that sudden movement of the latter serves to swing the arm rather than tear the strip as would otherwise be the case if the feeding device were operating against the inertia of the roll.

The feed roller 37 is fixed to a shaft 55 extending through the side plates 25 and 26 and rotatably journaled in the outer side plates 23 and 24. Rotation of the shaft is achieved through a drive means generally indicated 56 which includes a lever arm 57 fixed to the shaft 55 and to which one end 58 of a torsion spring 59 is secured. The other end 60 of the torsion spring is fixedly secured to the side plate 23. Rotation of the arm 57 and hence of the shaft 55 to operate the feed roller 37 in a feed direction is achieved by means of the torsion spring 59 and return of the shaft, which rewinds the spring, is achieved through a second lever 61. For that purpose the right-hand end (as seen in Fig. 12) of the lever 61 is provided with an elongated slot 62 which receives a pin 63 mounted upon another arm 64 oscillated in the slot by the drive mechanism. The arm 64 is secured to a cross shaft 65 rotatably mounted in the frame and adapted to be oscillated by a crank arm 66 secured to that shaft and provided with a slot 67 engaging a pin 68 carried by a gear wheel 69. The gear wheel is rotated by a motor 69a through the belt and pulley drive shown.

The guide means 39 is supported by a plate 70 secured to the side plates 25 and 26 and includes an upper plate 71 and a lower plate 72 vertically spaced therefrom to provide therebetween a guide channel 73 through which the strip of labels is led. The upper plate 71 is provided with a first opening 74 through which one end of a pivotally mounted anti-backslip dog 75 extends to rest upon the strip as it is led through the channel 73. The purpose of the dog 75 is to prevent the strip of labels from slipping backwardly within the channel 73 as the feed mechanism is oscillated.

Figure 7:
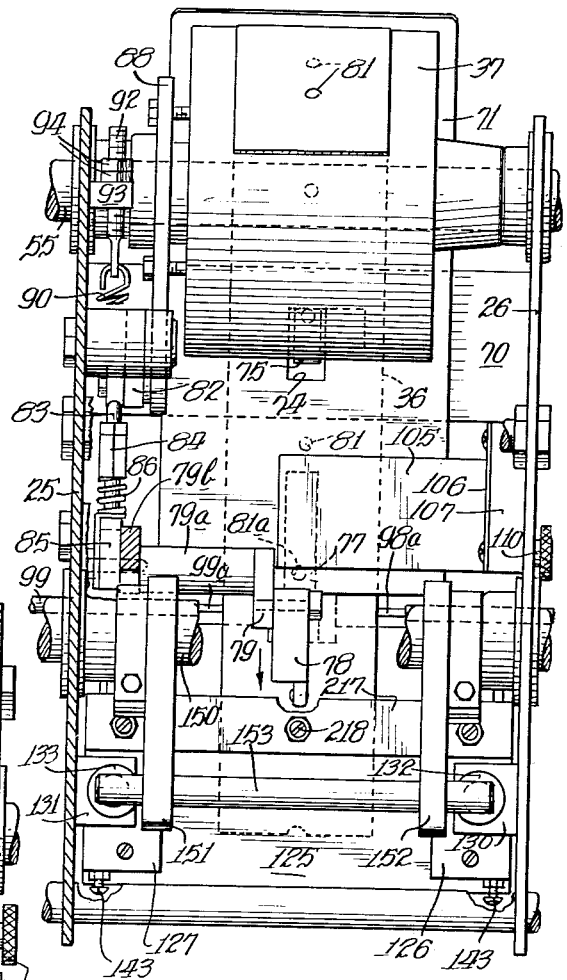
Fig. 7 is an elevational view taken along the line 7—7 of Fig. 5.

The plates 71 and 72 are each provided with a cut-out portion to define a second opening 77 elongated in the direction of travel of the strip (which direction is indicated by the arrow thereon in Fig. 7) to receive the free end of a feed finger 78 pivotally secured to an oscillatable feeding arm 79 having an offset portion 79a fixed to a second arm portion 79b which is fixed to a shaft 80 rotatably secured in the plate 25. The free end of the feed finger is provided with a notch-like portion 78a adapted to engage one of the perforations 81 with which the label strip is provided.

The arm 79 is resiliently connected to a second pivotally mounted arm 82. A rod 83 is rotatably connected at one end to the lower end of the arm 82 and carries a stop nut 84 and the opposite end of the rod is slidably received in a journal-like member 85 secured to the arm 79b. A compression spring 86 extends between the members 84 and 85 so that as the arm 82 is oscillated the force of such oscillation is transmitted to the arm 79 by means of the spring 86.

The lower end of the arm 82 also carries a cam follower 87 adapted to engage the surface of a cam 88 secured to the feed roller 37. Thus as the shaft 55 is oscillated in the manner hereinbefore described, the arms 82 and 79 are oscillated to swing the feed finger 78 along the elongated opening 77. Return of the feed mechanism on its return stroke is accomplished by means of a spring 90 having one end secured to a pin 91 on the arm 79b and its other end secured to a spring rod 92 which extends through a boss 93 secured to the side plate 26 and is held therein by means of the nut and lock nut arrangement 94 as shown. Adjustment of the tension of the spring may be achieved by adjusting the position of the nut and lock nuts 94 on the rod 92 in the usual manner.

As the feed finger 78 is oscillated with oscillation of the shaft 55, the notched portion 78a enters the opening 77 to engage a perforation in the portion of the strip positioned therein to move the strip through the full length of the stroke of the feed finger. The length of the stroke is, of course, determined by the shape of the cam 88. During the latter portion of the feed movement the bottom of the notch 78a rides in a groove 96 formed in a base plate 97 to guide the finger during its feed travel. To provide for proper guiding of a strip of labels which may, from job to job, vary in width, a pair of guide rods 98 and 99 are slidably mounted in the side plates 25 and 26 and extend at either side into cut-out portions 100 in the guide plates. The rods 98 and 99 are frictionally held against movement by engagement with the side plates and may be slid inwardly or outwardly toward or away from the strip 36 so as to bring the edge of a block 98a and 98b carried by the inner ends of each rod at the side edges of the desired path of travel of the strip through the guide means.

In previous forms of feed mechanism for labeling machines, feed has been achieved through pegs or pin teeth formed on a feed roll which engage the perforations on a strip. Such an arrangment is definitely limited in its capabilities inasmuch as it can handle only strips having perforations which are spaced apart only a few definite distances. Thus such pegs can only be arranged to take a strip where the perforations are separated exactly by multiples of a definite distance. For example, if the peg holes are one-half inch apart, the feed roller can accommodate strips having perforations one-half inch, one inch, one and one-half inches, etc., apart, but not one where the perforations are, for instance, three-quarters of an inch apart. The present feed mechanism is designed to accommodate labels whose perforations are any distance apart within the working range for which the apparatus is designed. Thus in the particular embodiment chosen for illustration the apparatus is capable of handling labels whose perforations are anywhere from one-half inch to three inches apart. Thus the perforations may be two and seven-eighths inches or one and fifteen-sixteenths inches apart, or any other distance within that working range. Furthermore, the printer, who prints up the strip of labels and forms the perforations therein, need not work to the exact specifications required in machines of the previous design. Thus, if the holes are slightly off-center from the prescribed distance the peg or pin tooth feed machine will gradually walk out of the perforations and pierce the label itself. The apparatus of this invention, however, is designed to accommodate itself to slight variations in the precise location of the perforations and to continue its feed in spite of such discrepancies.

It is clear from the description of the feed mechanism up to this point that the feed finger 78 is oscillated through the same distance during each feeding operation. The adaptability of the present apparatus is achieved through the use of means preventing the feed finger from engaging a perforation until the distance between the point of engagement and the end of the feed stroke of the finger is equal to the distance between perforations. To prevent engagement of the feed finger with a perforation there is provided a plate 105 positioned over the elongated opening 77 and slidably mounted in the side plate 26. To this end the plate 105 is provided with a vertically upstanding edge 106 which is secured by means of the screws illustrated to a block 107 which is slidable in a slot 108 formed in the side plate 26. Secured in the block 107 is a bolt 109 which extends outwardly through the slot and to which is threaded a knob 110. Thus by loosening the knob 110 the block can be slid in the slot 108 to position the plate 105 at various points over the opening 77. A suitably inscribed scale 111 is provided on the side plate 26 which cooperates with an indicator 112 fixed to the block so that the plate 105 may be set at any of the distances indicated (or at any fractional parts thereof) depending upon the distance between perforations. With the plate properly positioned the feed finger 78 during its initial feed movement rides upon the plate 105 and thus does not engage a perforation until the notch portion 78a reaches the end of the plate, whereupon it may drop by gravity to engage the perforation 81a located at the edge of the plate.

As an example of the operation of the plate 105, let us assume that the perforations 81 are one inch apart while the feed finger 78 swings through a distance of three inches on its feed movement. If it were not for the plate 105, the feed finger would feed three inches of the strip each time it is oscillated and thus feed three labels to the cutting apparatus. By the interposition of the plate 105, however, the feed finger can be prevented from engaging the first two perforations and engages only the last perforation to move the strip one inch.

As the notch 78a on the feed finger engages a perforation and starts the strip on its feed movement toward the cutting apparatus the first effect of such movement is to bring the strip against the high friction surface 38 of the feed roller. At this time the feed roller is rotating in a feed direction. This action of the feed finger in effect "snubs" the strip around the outer surface of the feed roller, with the result that it is the feed roll which delivers the power to unroll the strip from the roll 35. This arrangement prevents tearing of the perforations by the feed finger inasmuch as very little pull on the strip itself is exerted by the finger, substantially all of the pull coming from the feed roller. To insure sufficient feed from the roll 35, the feed roller is rotated in the feed direction a distance in excess of the maximum feed movement of the finger. In the model chosen for illustration, the feed roller rotates three and one-sixteenth inches for a three inch feed movement of the finger.

The cutting device 41 includes a first cutter bar 120 fixed to an arm 121 secured to a shaft 122 rotatably mounted in the side plates 25 and 26. Secured to the shaft 122 is a pin 123 (Fig. 3) to which is secured a spring 124 constantly to urge the arm 121 toward swinging movement in the direction of the path of movement of a second cutter bar 125 mounted for vertical movement on the machine. To provide for such movement, the second cutter bar is secured to a pair of rectangular lugs 126 and 127, each of which carry a vertically upstanding rod 128 and 129 which are slidably received in suitable openings provided in a pair of blocks 130 and 131 secured to the side plates 25 and 26 respectively. Thrust washers 132 and 133 are secured near the top of each of the rods and compression springs 134 and 135 bear against the underside of each washer and the top of the blocks 130 and 131 constantly to urge the second cutter bar upwardly out of the path of movement of the strip.

The cutter bar 120 is provided with a cutting edge 140 adapted upon engagement with a cutting edge 141 provided on the second cutter bar to cut a strip of the label fed therebetween into an individual section. To assist in the cutting operation at least one of the cutting edges is slanted both in the horizontal and vertical with respect to the other edge, the slant being substantially one-eighth inch in each direction. Thus one end of one of the two cutter bars is positioned one-eighth inch higher than the other end of that edge and also positioned one-eighth inch away from the opposite edge longitudinally of the direction of movement of the strip of material as it is fed thereto. To prevent the lower bar 120 from assuming a position vertically beneath the upper cutter bar the block 126 which the latter carries is provided with a stop pin 142 adapted to engage one side of the arm 121. Means in the form of the screw device 143 is provided for adjusting the position of the stop to take care of wear, etc. on the cutting edges. Thus, when the upper cutter bar is lowered toward the lower bar, the stop 142 prevents the lower bar from interfering with such downward movement until the edges 140 and 141 engage. Further downward movement of the second cutter bar causes the arm 121 to pivot in a direction separating the stop 142 from contact therewith due to the slant of the cutting edge as previously described.

Downward movement of the second cutter bar is achieved by means of a power driven shaft 150 rotatably journaled in the side plates 25 and 26 to which is secured a pair of arms 151 and 152 which carry at their outer ends a rod 153 adapted to contact the top of the rods 128 and 129 as the arms are rotated downwardly through clockwise (as seen in Figs. 4 and 5) rotation of the shaft 150. Rotation of the shaft 150 is achieved by means of a lever arm 155 which is pivotally secured to a rod 156 forming part of the power drive. The lower end of the rod 156 carries a thrust washer 156a and is surrounded by a compression spring 156b which bears at its other end against a bracket 157 secured to an arm 157a which is pivotally mounted at 157b to the frame. Secured to the arm 157a is a gate cam 158 provided with a slot 158a closed at one end by a pivotally mounted gate 158b. An arm 159 is secured to the shaft 65 and carries a pin 159a at its lower end movable through the slot. As the arm 159 is pivoted in a counterclockwise direction (as seen in Fig. 12) the pin travels through the slot and swings the gate open. Upon reverse movement of the arm, the gate remains closed and the pin 159a rides over the outer surface of the gate and cam to rock the arm 157a downwardly to move the rod 157 downwardly and hence to lower the second cutter.

The bottom of the second cutter bar is provided with an arcuate resilient plate 160. The plate is provided with slots engaging the studs 160a and is convex downwardly. Preferably the plate is of clock-spring material and thus as the cutter is moved downwardly the plate engages a cut section of label, first along the line contact and then as such movement continues the contact spreads outwardly towards the edges of the label to expel air from beneath the label. By this arrangement considerably less pressure between the label and the supporting strip is required in order to insure a perfect seal. The downward force exerted by the plate 160 is opposed by the upward force exerted by a plate 161 which is carried by a heating element 162 which supplies the heat to heat seal the label to the cellophane supporting material.

The plate 161 (see Fig. 8) is removably held on the heating element 162 by a plurality of pins 163 which extend through suitable openings 164 in the plate. The pins frictionally engage the sides of the opening to effect a "snap-on" connection therebetween so that the plate 161 is easily removable. Thus the plate 161 can be removed and replaced with another heating plate of a different size or shape simply by inserting a screwdriver or other tool in between the plate and the heating element to pry it from the pins. Thus if it is necessary to change the machine from use with labels three inches long to labels one and three-quarters inches long the plate 161 having a size equal to the size of the first label can be replaced by a second plate having a size of the second label. Furthermore, if it is desired to seal only part of the label to the cellophane support, a heating plate 161 smaller than the label may be used so that a part of the label may be left free to be torn off, such as for memorandum purposes and the like.

For swinging the heating element and its heating plate upwardly against the opposed side of the cellophane material there is provided a squared rod 170 secured to one end of an arm 171 whose other end is secured to a shaft 172 rotatably journaled in the side plates 25 and 26. The shaft 172 is connected to the shaft 150 by a toggle link mechanism 173 including a first arm 174 secured to the shaft 172 and provided at its upper end with a notch 175 which engages a pin 176 secured to one end of a second arm 177 secured to the shaft 150. Thus as the shaft 150 is oscillated in one direction, first to cut a label into a section and then to press the plate 160 against the cut section, the shaft 172 is rotated in the opposite direction to bring the heating plate 161 against the opposite sides of the supporting material to press the label and the material therebetween.

As best seen in Fig. 4, the heating element 162 and the plate 161 which it carries are resiliently supported upon the squared shaft 170 in order to assure that proper pressure is exerted between plates 160 and 161 to effect the seal. To this end a flat rectangular plate 180 is secured to the upper side of the shaft 170 by means of the bolts 181 which pass through a second plate 182 which contacts the lower side of the shaft 170. A plurality of bolts 183 extend through suitable openings in the plate 180 and are threadably received in the heating element 162. Intermediate the bottom side of the heating element and the upper side of the plate 180 there is provided a plurality of springs 184, each of which surrounds one of the bolts 183, resiliently to support the heating element and the plate 161 which it carries.

As has been previously pointed out, operation of the feed mechanism is achieved through the unwinding of the torsion spring 59 and thus the feed mechanism is entirely spring driven. Operation of the power driven means serves to rewind the spring after the same has accomplished a feeding operation. If it should be desired to feed the supporting strip of cellophane 42 without feeding labels, the operation of the feed mechanism may be blocked by the use of a stop handle 190 which is secured to a rod 191 rotatably journaled in the frame. The handle 190 is provided at one end of the apparatus, preferably where the operator would normally stand, and which is located immediately to the right of the cutter 47 shown in Fig. 3. The opposite end of the rod 191 carries a stop lug 192 adapted when the rod 191 is rotated to contact a stop arm 193 secured to the shaft 55. Thus with the stop 192 in operating position it serves to block rotation of the shaft 55 in a clockwise direction (as seen in Fig. 9) and thus to prevent unwinding of the torsion spring. During operation of the machine when this condition exists the pin 63 merely slides in the slot 62 and motion of the lever arm 61 under the influence of the torsion spring is prevented. To start the feed of labels it is only necessary to rotate the handle 190 to move the stop 192 out of the path of movement of the stop arm 193 whereupon the torsion spring will effect the feed in the manner previously described.

The apparatus of this invention is capable of heat sealing a label to the supporting material at any desired location thereon. Thus the entire feed, cutting and sealing mechanism supported in the plates 25 and 26 can be shifted laterally of the path of movement of the supporting material upon the transverse rods fixed in the outer frame plates 23 and 24 which support it in position. Thus, the label can be affixed in the center of the supporting material or at any place between center and either edge. Furthermore, the outer roller 200 about which the strip of supporting material 42 is led may be shifted inwardly and outwardly by a rack and pinion device 201 operated by means of a worm gear arrangement 202 through the medium of a manually operable handle 203. Feed of the supporting material 42 is achieved through a power driven feed roller (not shown) which rotates a predetermined amount during each cycle of the machine. Inward and outward adjustment of the roll 200 by the means just described serves to vary the position of the label with reference to the cutter 47 which cuts the supporting material into individual sections so that the label may be located in the center, adjacent the forward or adjacent the rear edge of the strip, or at any intermediate point.

The printing mechanism 45 may be hung on the forward part of the frame if it is desired to print any information, such as the date or the locus of the packaging operation. The printing mechanism consists of a pair of inking rolls 210 and 211 which are rotatably mounted in a frame 212 and are adapted to contact the surface of print carried by a printing roller 213. The frame is provided with a notch 214, adapted to rest upon a rod 215 fixed between the frame plates 25 and 26, and with an elongated arm 216 adapted to rest under a crossbar 217 carried by the second cutter 125 in position to be contacted by an adjustable screw device 218 mounted on the crossbar. The printing roll 213 contacts the cellophane strip 42 and is rotated thereby to bring the type thereon into contact first with the inking roller 211 and then with the labels to print thereon. As the cutter 125 is depressed during a subsequent cycle, the printing mechanism is pivoted about the rod 215 to raise the roller out of contact with the strip so that it may rotate by a contained torsion spring back to its initial starting position. In the event that the length of the strip 42 fed during each cycle is greater than the circumference of the printing roll, there is provided on the periphery of the printing roll a notch 219 which, when it reaches the location of the strip 42, is sufficiently deep as to prevent driving engagement between the strip and the printing roll whereby the latter remains stationary until the cutter bar 125 is depressed again to lift the entire roll out of contact with the strip 42.

I claim:
1. A device for feeding a continuous strip of perforated material in increments equal to the distance between perforations comprising means adapted rotatably to carry a roll of said strip, a guide plate adapted to guide the free end of said strip in a predetermined path, a movable feed finger positioned to engage a perforation in the portion of the strip in the guide plate, a rotatably mounted feed roller positioned to have said strip wrapped partially therearound and normally out of frictional feeding engagement therewith as it is led from the roll to the guide plate, means for rotating the feed roller a distance at least equal to said distance between perforations, and means for moving the feed finger during the rotation of the feed roller and while in engagement with a perfora- tion to move the strip whereby to snub the strip against and into frictional feeding engagement with the rotating feed roller and thus to feed the strip from the roll.

2. A device for feeding a continuous strip of perforated material in increments equal to the distance between perforations comprising means adapted rotatably to carry a roll of said strip, a guide plate adapted to guide the free end of said strip in a predetermined path, a movable feed finger positioned to engage a perforation in the portion of the strip in the guide plate, means for moving the finger in a feed direction over the guide plate to a predetermined point, and means for preventing engagement of the finger with a perforation during movement in said feed direction until the distance between the finger and said predetermined point equals the distance between perforations.

3. A device for feeding a continuous strip of perforated material in increments equal to the distance between perforations comprising means adapted rotatably to carry a roll of said strip, a guide plate adapted to guide the free end of said strip in a predetermined path, a movable feed finger positioned to engage a perforation in the portion of the strip in the guide plate, means for moving the finger in a feed direction over the guide plate to a predetermined point, and a plate adjustably positioned immediately above the guide plate and adapted to prevent engagement of the finger with a perforation during movement in said feed direction until the distance between the finger and said predetermined point equals the distance between perforations.

4. A device for feeding a continuous strip of perforated material in increments equal to the distance between perforations comprising means adapted rotatably to carry a roll of said strip, a guide plate adapted to guide the free end of said strip in a predetermined path, a movable feed finger positioned to engage a perforation in the portion of the strip in the guide plate, a rotatably mounted feed roller positioned to have said strip wrapped partially therearound as it is led from the roll to the guide plate, said strip being normally out of frictional feeding engagement with the roller, means for rotating the feed roller a distance at least equal to said distance between perforations, means for moving the finger in a feed direction over the guide plate to a predetermined point, and a plate adjustably positioned immediately above the guide plate and adapted to prevent engagement of the finger with a perforation during movement in said feed direction until the distance between the finger and said predetermined point equals the distance between perforations, engagement of the finger with a perforation being adapted to move the strip whereby to snub the strip against the rotating feed roller and into frictional feeding engagement therewith, thus to feed the strip from the roll.

5. A device for feeding a continuous strip of perforated material in increments equal to the distance between perforations comprising means adapted rotatably to carry a roll of said strip, a guide plate having means for guiding the free end of the strip across the guide plate in a direction longitudinally of the strip and having a feed opening extending longitudinally of the strip at the location of the perforations therein, a movably mounted feed finger positioned to enter said opening and engage a perforation in the strip positioned therein, a rotatably mounted feed roller having a high-friction surface and positioned to have said strip wrapped partially therearound as it is led from the roll to the guide plate, said strip being normally out of frictional feeding engagement with the roller, means for intermittently rotating the feed roller a distance in excess of the distance between perforations, and means for moving the finger longitudinally of the strip during rotation of the feed roller and while in engagement with a perforation to move the strip longitudinally across the guide plate whereby to snub the strip against the rotating surface of the feed roller and into frictional feeding engagement therewith, thus to feed the strip from the roll.

6. A device for feeding a continuous strip of perforated material in increments equal to the distance between perforations comprising means adapted rotatably to carry a roll of said strip, a guide plate having means for guiding the free end of the strip across the guide plate in a direction longitudinally of the strip and having a feed opening extending longitudinally of the strip at the location of the perforations therein, a feed finger positioned to enter said opening to engage a perforation in the strip positioned therein and mounted for movement longitudinally of the opening, adjustably mounted means for preventing the finger from entering the opening during a predetermined portion of the initial movement of the feed finger, power driven feed means adapted upon contact with the strip to frictionally engage the same to feed the strip from the roll to the guide plate, said feed means being normally out of frictional engagement with the strip, and means for moving the finger longitudinally of the opening ultimately to bring it into engagement with a perforation to move the strip longitudinally of the guide plate and to bring the strip into frictional engaging contact with the feed means.

7. A device for feeding a continuous strip of perforated material in increments equal to the distance between perforations comprising means adapted rotatably to carry a roll of said strip, a horizontal guide plate having means for guiding the free end of the strip across the base plate in a direction longitudinally of the strip and having a feed opening extending longitudinally of the strip at the location of the perforations therein, a feed finger positioned to enter said opening to engage a perforation in the strip positioned therein and mounted for movement longitudinally of the opening, a plate positioned to overlie the guide plate and adjustably mounted to cover a predetermined portion of said opening to prevent the finger from entering the opening during a predetermined portion of its initial movement, power driven feed means adapted upon contact with the strip to frictionally engage the same to feed the strip from the roll to the guide plate said feed means being normally out of frictional engagement with the strip, and means for moving the finger longitudinally of the opening ultimately to bring it into engagement with a perforation to move the strip longitudinally of the guide plate and to bring the strip into frictional engaging contact with the feed means.

8. A device for feeding a continuous strip of perforated material in increments equal to the distance between perforations comprising means adapted rotatably to carry a roll of said strip, a horizontal guide channel having an elongated opening in its upper surface extending longitudinally of a strip of the material fed through the channel and with the channel having a width in excess of the width of the strip, a pair of adjustable guide stops extending into the channel on either side of a strip therein for guiding the strip through the channel along a path to position the perforations therein beneath the opening, a feed finger positioned to enter said opening to engage a perforation in the portion of the strip in the channel and mounted for reciprocal movement in a feed direction and return longitudinally of the opening, a pivotally mounted anti-backslip dog contacting the strip in advance of the finger through a second opening in the upper surface of the sleeve to prevent movement of the strip during return movement of the feed finger, a plate positioned to overlie the guide channel and adjustably mounted to cover a predetermined portion of said elongated opening to prevent the finger from entering the last-mentioned opening during a predetermined portion of its initial movement, power driven feed means adapted upon contact with the strip to frictionally engage the same to feed the strip from the supply roller to the guide channel, said feed means being normally out of frictional engagement with the strip and means for moving the finger longitudinally of the elongated opening ultimately to bring it into engagement with a perforation to move the strip longitudinally of the guide channel and to bring the strip into frictional engaging contact with the feed means.

9. A device for feeding a continuous strip of perforated material in increments equal to the distance between perforations comprising means adapted to carry a roll of said strip, a horizontal guide channel having an elongated opening in its upper surface extending longitudinally of a strip of the material fed through the channel and with the channel having a width in excess of the width of the strip, a pair of adjustable guide stops extending into the channel on either side of a strip therein for guiding the strip through the channel along a path to position the perforations therein beneath the opening, a rotatable shaft, a rubber surfaced feed roller fixed to the shaft and positioned to have said strip wrapped partially therearound as it is led from the roll to the guide channel, said strip being normally out of frictional feeding engagement with the roller, a pivotally mounted arm, a feed finger mounted on the free end of the arm and positioned to enter said opening to engage a perforation in the portion of the strip in the channel to move the strip and thereby to cause frictional feeding engagement of the strip with the roller, means for driving the shaft through an oscillatory movement to rotate the feed roller a distance in excess of the distance between perforations, means including a cam fixed relative to the shaft to oscillate the arm with movement of the shaft to reciprocate the finger in a feed direction and return longitudinally of the opening, a pivotally mounted anti-backslip dog contacting the strip in advance of the finger through a second opening in the upper surface of the channel to prevent movement of the strip during return movement of the feed finger, a plate positioned to overlie the guide channel and adjustably mounted to cover a predetermined portion of said elongated opening to prevent the finger from entering the last-mentioned opening during a predetermined portion of its initial movement in the feed direction, means for adjusting the plate, and a scale associated with said adjusting means including an indicator to indicate on the scale the position of the last-named plate.

10. A device for feeding a continuous strip of perforated material in increments equal to the distance between perforations comprising a frame, means mounted in the frame and adapted rotatably to carry a roll of said strip, guide means mounted on the frame for guiding the free end of the strip in a direction longitudinally of the strip and having a feed opening extending longitudinally of the strip at the location of the perforations therein, a shaft rotatably mounted in the frame, a feed roller fixed to the shaft and positioned to have said strip wrapped partially therearound as it is led from the roll to the guide means, said strip being normally out of frictional feeding engagement with the roller, a first arm having one end pivoted to the frame, a second arm having one end pivoted to the frame, means including a spring resiliently connecting the first arm to the second arm, a second spring having one end connected to the frame and connected at its other end to one of said arms constantly to bias the arms toward movement in one direction, a feed finger mounted on the other end of the second arm and positioned to enter said opening to engage a perforation in the portion of the strip in the guide means to move the strip and thereby to cause frictional feeding engagement of the strip with the roller, means for oscillating the shaft through a feed and return direction including a torsion spring secured to the shaft and to the frame, means for rotating the shaft in a return direction to wind the spring and means for releasing the shaft to permit the spring to rotate the shaft in a feed direction, and a cam fixed relative to the shaft and engaging the first arm to swing the arms in the other direction with rotation of the shaft in the feed direction to move the finger longitudinally of the strip and while in engagement with a perforation to move the strip longitudinally across the guide means.

11. A device for feeding a continuous strip of perforated material in increments equal to the distance between perforations and for cutting the strips into sections having a length equal to said distance comprising a frame, means mounted in the frame and adapted rotatably to carry a roll of said strip, guide means mounted on the frame for guiding the free end of the strip in a direction longitudinally of the strip and having a feed opening extending longitudinally of the strip at the location of the perforations therein, a shaft rotatably mounted in the frame, a feed roller fixed to the shaft and positioned to have said strip wrapped partially therearound as it is led from the roll to the guide means, said strip being normally out of frictional feeding engagement with the roller, a first arm having one end pivoted to the frame, a second arm having one end pivoted to the frame, means including a spring resiliently connecting the first arm to the second arm, a second spring having one end connected to the frame and connected at its other end to one of said arms constantly to bias the arms toward movement in one direction, a feed finger mounted on the other end of the second arm and positioned to enter said opening to engage a perforation in the portion of the strip in the guide means to move the strip and thereby to cause frictional feeding engagement of the strip with the roller, means for oscillating the shaft through a feed and return direction including a torsion spring secured to the shaft and to the frame, a motor, means connecting the motor to the shaft for rotating the shaft in a return direction to wind the spring and means for releasing the shaft to permit the spring to rotate the shaft in a feed direction, a cam fixed relative to the shaft and engaging the first arm to swing the arms in the other direction with rotation of the shaft in the feed direction to move the finger longitudinally of the strip and while in engagement with a perforation to move the strip longitudinally across the guide means, a cutter positioned on the frame in the feed direction from the guide means and adapted to receive the portion of the strip fed therefrom, and means connecting the cutter to the motor to operate the same on the return movement of the shaft to cut said portion of the strip.

12. In combination with a machine having means for intermittently feeding two strips of material of unequal width in predetermined increments and in vertically spaced alignment with one of said strips being thermoplastic, means for cutting the narrower strip into sections and heat sealing cut sections to the other strip comprising a first cutter bar positioned above the wider strip, a second cutter bar also positioned above the wider strip and movable across the first bar to cut a section from a portion of the narrower strip fed therebetween, an arcuate resilient plate on the bottom of the movable cutter bar, a second plate beneath the wider strip, means for moving the movable cutter bar across the first cutter bar to cut a section and then to bring the resilient plate into contact with said cut section spreadingly to press the same against the upper side of the wider strip with the opposed side of the last mentioned strip being supported by the second plate, and means for heating one of the plates.

13. In a device for feeding a continuous strip of material in predetermined increments, means for cutting the strip into sections and heat sealing cut sections to a thin supporting material comprising a frame for supporting the device, a first cutter bar, a second cutter bar vertically movable on the frame across the first bar to cut a section from a portion of the strip fed therebetween, an arcuate resilient plate on the bottom of the second cutter bar, means for positioning a relatively wide piece of supporting material beneath the cutter bars to support a cut section therefrom on its upper surface with one of said materials being thermoplastic, an electrical heating unit movably mounted on the frame beneath the supporting material, a heating plate, means including a snap-on connection for securing the heating plate in heat conductive relationship to the heating unit, means for moving the second cutter bar vertically downwardly across the first cutter bar to cut a section and then to bring said plate into contact with said cut section to press the same against the upper side of the supporting strip, and means for moving the heating unit upwardly to press the heating plate against the opposed side of the supporting material to heat seal the cut section thereto.

References Cited in the file of this patent

UNITED STATES PATENTS

| | | |
|---|---|---|
| 1,538,977 | Feybusch et al. | May 26, 1925 |
| 1,799,533 | Remnsneder | Apr. 7, 1931 |
| 1,949,158 | Gay | Feb. 27, 1934 |
| 2,135,684 | Walsh et al. | Nov. 8, 1938 |
| 2,244,140 | Caldwell | June 3, 1941 |
| 2,326,436 | Caldwell | Aug. 10, 1943 |
| 2,435,267 | Cahn | Feb. 3, 1948 |
| 2,449,298 | Hoppe | Sept. 14, 1948 |
| 2,514,554 | Nowelsky | July 11, 1950 |
| 2,523,388 | Oskow | Sept. 26, 1950 |
| 2,530,335 | Krueger et al. | Nov. 14, 1950 |
| 2,537,360 | Martindell | Jan. 9, 1951 |
| 2,619,247 | Gaubert | Nov. 25, 1952 |